US009793562B2

(12) United States Patent
Yamamoto et al.

(10) Patent No.: US 9,793,562 B2
(45) Date of Patent: Oct. 17, 2017

(54) FUEL CELL SYSTEM, FUEL CELL-MOUNTED VEHICLE AND METHOD OF CONTROLLING FUEL SYSTEM

(71) Applicant: TOYOTA JIDOSHA KABUSHIKI KAISHA, Toyota-shi, Aichi-ken (JP)

(72) Inventors: Kazuo Yamamoto, Toyota (JP); Hiroyuki Imanishi, Toyota (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 63 days.

(21) Appl. No.: 14/934,717

(22) Filed: Nov. 6, 2015

(65) Prior Publication Data

US 2016/0141687 A1 May 19, 2016

(30) Foreign Application Priority Data

Nov. 14, 2014 (JP) .................. 2014-231916

(51) Int. Cl.
| | |
|---|---|
| *H01M 8/04* | (2016.01) |
| *H01M 8/04746* | (2016.01) |
| *B60L 11/18* | (2006.01) |
| *H01M 8/04119* | (2016.01) |
| *H01M 8/04828* | (2016.01) |
| *H01M 8/04089* | (2016.01) |

(52) U.S. Cl.
CPC ..... *H01M 8/04776* (2013.01); *B60L 11/1883* (2013.01); *H01M 8/04097* (2013.01); *H01M 8/04156* (2013.01); *H01M 8/04753* (2013.01); *H01M 8/04843* (2013.01); *H01M 2250/20* (2013.01); *Y02T 90/32* (2013.01)

(58) Field of Classification Search
CPC ........ H01M 8/04776; H01M 8/04097; H01M 8/04753; H01M 8/04156; H01M 8/04843; B60L 11/1883
See application file for complete search history.

(56) References Cited

U.S. PATENT DOCUMENTS

| 8,192,884 B2* | 6/2012 | Hasuka | H01M 8/04156 |
| | | | 429/428 |
| 8,277,999 B2* | 10/2012 | Izutani | H01M 8/04164 |
| | | | 429/428 |
| 8,338,040 B2* | 12/2012 | Matsusue | H01M 8/04223 |
| | | | 429/414 |

(Continued)

FOREIGN PATENT DOCUMENTS

| CA | 2 811 184 A | 3/2012 |
| JP | 2007-115460 | 5/2007 |

(Continued)

*Primary Examiner* — Stewart Fraser
(74) *Attorney, Agent, or Firm* — Finnegan, Henderson, Farabow, Garrett & Dunner, LLP

(57) ABSTRACT

When a first timing at which a fuel gas is injected to a fuel gas supply flow path by an injector and a second timing at which water residing on a circulation flow path is discharged by controlling rotating speed of a circulation pump coincide with each other, a controller performs either: (i) a first process of operating the circulation pump at a preset RPM without injecting the fuel gas to the fuel gas supply flow path by the injector; or (ii) a second process of injecting the fuel gas to the fuel gas supply flow path by the injector and operating the circulation pump at an RPM lower than the preset RPM.

7 Claims, 6 Drawing Sheets

(56) References Cited

U.S. PATENT DOCUMENTS

| | | | | |
|---|---|---|---|---|
| 2009/0029200 | A1* | 1/2009 | Izutani | H01M 8/04164 429/415 |
| 2010/0203411 | A1* | 8/2010 | Hasuka | H01M 8/04156 429/442 |
| 2010/0239935 | A1 | 9/2010 | Katano | |
| 2012/0189925 | A1* | 7/2012 | Matsusue | H01M 8/04223 429/414 |
| 2016/0141656 | A1* | 5/2016 | Yamamoto | H01M 8/04835 429/414 |
| 2016/0141660 | A1* | 5/2016 | Yamamoto | H01M 8/04179 429/415 |

FOREIGN PATENT DOCUMENTS

| | | |
|---|---|---|
| JP | 2007-128761 | 5/2007 |
| JP | 2008-146923 | 6/2008 |
| JP | 2009-129781 A | 6/2009 |
| JP | 2009-140696 | 6/2009 |
| JP | 2011-138790 | 7/2011 |

\* cited by examiner

FUEL CELL SYSTEM, FUEL CELL-MOUNTED VEHICLE AND METHOD OF CONTROLLING FUEL SYSTEM

CROSS REFERENCE TO RELATED APPLICATIONS

This application claims priority to Japanese Patent Application No. 2014-231916 filed on Nov. 14, 2014, the entire contents of which are incorporated by reference herein for all purpose.

FIELD

The present invention relates to a fuel cell system to be mounted on a fuel cell-mounted vehicle.

RELATED ART

In a fuel cell system, hydrogen in a fuel tank is injected by an injector to a hydrogen supply flow path and is supplied to a fuel cell. Unreacted hydrogen contained in discharge gas of the fuel cell is recirculated to the hydrogen supply flow path via a hydrogen circulation flow path on which a hydrogen circulation pump is provided. In this case, since the discharge gas of the fuel cell contains water vapor, the water vapor in some cases may be condensed to become liquid water, sticking to the hydrogen circulation flow path. With large amounts of liquid water sticking to and residing on the hydrogen circulation flow path, power of the fuel cell is increased so that the rotating speed of the hydrogen circulation pump is increased, making the liquid water to more easily flow into the hydrogen circulation pump. As a result of this, such problems can occur as generation of noise vibrations at the hydrogen circulation pump or addition of the rotational load of the hydrogen circulation pump that causes rotating speed of the pump to lower. As a countermeasure for these problems, a Japanese Patent laid-open publication (JP 2007-115460 A) describes a technique that the rotating speed of the hydrogen circulation pump is increased independently of running of the fuel cell so as to blow away the liquid water residing on the hydrogen circulation flow path.

However, when the hydrogen circulation pump is operated at high rotating speed, operating noise of the pump also increases. As hydrogen is injected by the injector under this condition, pressure pulsations in the hydrogen supply flow path or the hydrogen circulation flow path will be occurred, where a frequency of the pressure pulsations may coincide with a frequency (rotational frequency) of the operating noise of the hydrogen circulation pump so that noise vibrations may be generated by their resonance. Such a problem, in general, has been a problem that occurs in cases where generation of the operating noise of a fuel gas circulation pump and pressure pulsations due to the injection of the fuel gas coincide with each other.

SUMMARY

The present invention, having been accomplished to solve at least part of the above-described problems, may be implemented in the following aspects, In a first aspect of the invention, a fuel cell system is provided. The fuel cell system according to the first aspect comprises a fuel cell, a fuel gas supply flow path configured to supply a fuel gas to the fuel cell, an injector configured to intermittently inject the fuel gas to the fuel gas supply flow path, a fuel gas discharge flow path configured to discharge fuel exhaust gas from the fuel cell, a circulation flow path connecting the fuel gas supply flow path and the fuel gas discharge flow path to each other, a circulation pump provided on the circulation flew path and configured to supply the fuel exhaust gas to the fuel gas supply flow path, and a controller configured to control rotating speed of the circulation pump to a preset RPM (Revolutions Per Minute) to discharge water residing on the circulation flow path. When a first timing at which the fuel gas is injected to the fuel gas supply flow path by the injector and a second timing at which the water residing on the circulation flow path is discharged by controlling the rotating speed of the circulation pump coincide with each other, the controller performs either (i) a first process of operating the circulation pump at the preset RPM without injecting the fuel gas to the fuel gas supply flow path by the injector; or (ii) a second process of injecting the fuel gas to the fuel gas supply flow path by the injector and operating the circulation pump at an RPM lower than the preset RPM. According to this aspect, in the first process, since the first process of operating the circulation pump at the preset RPM is executed, liquid water may be discharged. In the second process, since the fuel gas is injected to the fuel gas supply flow path by the injector and moreover the circulation pump is operated at an RPM lower than the preset RPM, the circulation pump is operated at an RPM lower than the RPM preset for blowoff of liquid water, so that generation of noise vibrations due to resonance between pressure pulsations and operating noise of the circulation pump can be suppressed.

In the fuel cell system according to the first aspect, when the first process and the second process are not being performed, and power of the fuel cell is equal to or lower than a predetermined power value, the controller may perform a third process of increasing a fuel-gas injection quantity per stroke from the injector in comparison to that of the case where the power of the fuel cell is greater than the predetermined power value, and intermittently injecting the fuel gas at a injection cycle longer than a injection cycle preset for injection of the fuel gas. According to this aspect, since the injection cycle of the injector is lengthened, i.e. the number of injecting strokes per hour is reduced, generation of noise vibrations due to resonance between the pressure pulsations and the operating noise of the circulation pump can be further suppressed.

In the fuel cell system according to the first aspect, the controller, in the third process, may multiply the injection quantity per stroke r-fold and multiply the injection cycle r-fold (where r is a real number of 1 or more). According to this aspect, since the injection quantity per stroke is multiplied r-fold, necessary fuel gas can be supplied even if the injection cycle is lengthened r-fold. As a result, enough fuel gas can be supplied while generation frequency of noise vibrations is lowered.

In a second aspect of the invention, there is provided a fuel cell-mounted vehicle comprising: a vehicle; and the fuel cell system in accordance with any one of the above-described fuel cell systems. When the first timing and a third timing at which liquid water residing on the circulation flow path is blown off by increasing the rotating speed of the circulation pump coincide with each other, the controller; (a) executes either the first process or the second process if a running speed of the vehicle is equal to or lower than a predetermined low-speed threshold, and (b) operates the circulation pump at an RPM preset for blowoff of the liquid water if the running speed of the vehicle is higher than the low-speed threshold. According to this fuel cell-mounted vehicle, since either the first process or the third process is executed while the vehicle is at a stop or running at a low speed, drainage can be fulfilled so as to prevent excessive noise vibrations from being given to passengers. Also, since the circulation pump is operated at an RPM preset for blowoff of liquid water while the vehicle is running at a relatively high speed, liquid water residing on the circulation flow path can be blown off enough.

In addition, the present invention can be implemented in various aspects. For example, the invention can be implemented in the form of not only fuel cell systems but also fuel cell-mounted vehicles, fuel cell system control methods, and the like.

DESCRIPTION OF EMBODIMENTS

First Embodiment

Figure 1:
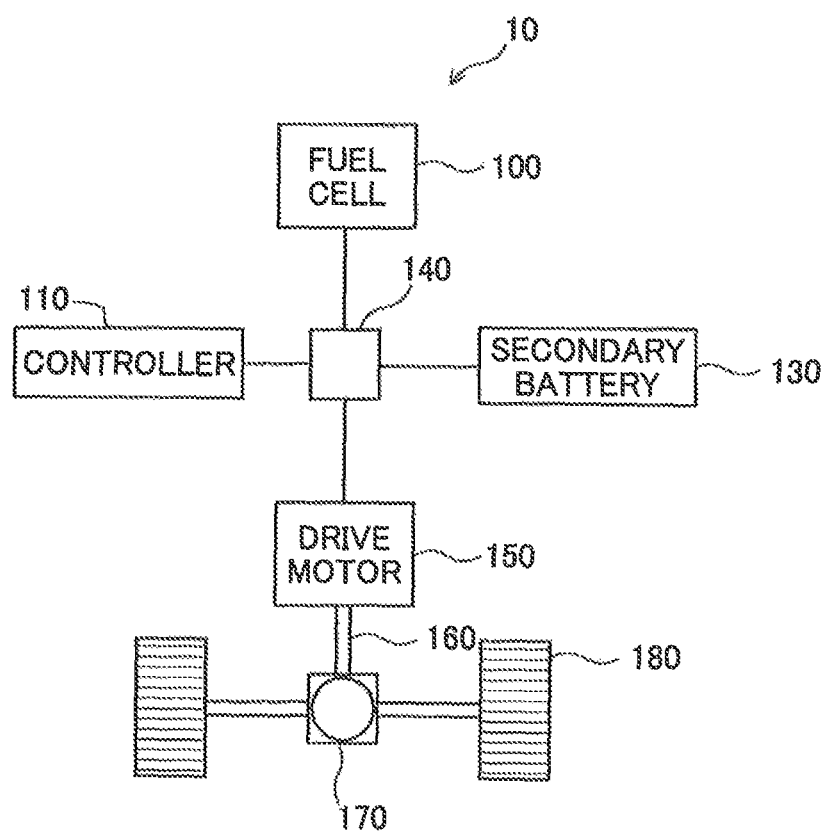
FIG. 1 is an explanatory view showing a fuel cell-mounted vehicle on which a fuel cell is mounted.

FIG. 1 is an explanatory view showing a fuel cell-mounted vehicle 10 (hereinafter, referred to also as 'vehicle 10' simply) on which a fuel cell is mounted. The vehicle 10 includes a fuel cell 100, a controller 110 (referred to also as ECU (Electronic Control Unit)), a secondary battery 130, a power distribution controller 140, a drive motor 150, a drive shaft. 160, a motive power distribution gear 170, and wheels 180.

The fuel cell 100 is a power generation device for generating electric power by electrochemical reaction of fuel gas and oxidizing gas. The controller 110 controls operations of the vehicle. Whereas the controller 110 employs the fuel cell 100 as a main power source for the vehicle, the controller 110 employs the secondary battery 130 as a power source for operating the vehicle 10 when the fuel cell 100 yields a small electric power generation on occasions, for example, immediately after a start-up of the vehicle 10. The secondary battery 130 may be provided by adopting, for example, a nickel hydrogen battery or a lithium ion battery. Charging to the secondary battery 130 may be fulfilled by, for example, using electric power outputted from the fuel cell 100 or using regenerative power obtained by regenerating kinetic energy of the vehicle 10 with the drive motor 150 upon deceleration of the vehicle 10. The power distribution controller 140, receiving a command from the controller 110, controls a power level to be pulled out from the fuel cell 100 to the drive motor 150 as well as a power level to be pulled out from the secondary battery 130 to the drive motor 150. Also, upon deceleration of the vehicle 10, the power distribution controller 140, receiving a command from the controller 110, supplies regenerative power regenerated by the drive motor 150 to the secondary battery 130.

The drive motor 150, receiving supply of electric power, functions as a motor for operating the vehicle 10. Also, upon deceleration of the vehicle 10, the drive motor 150 functions as a motor for regenerating kinetic energy of the vehicle 10 as electric energy. The drive shaft 160 is a rotating shaft for transmitting driving force produced by the drive motor 150 to the motive power distribution gear 170. The motive power distribution gear 170 distributes driving force to each of the left-and-right wheels of the rear-side wheels 180.

Figure 2:
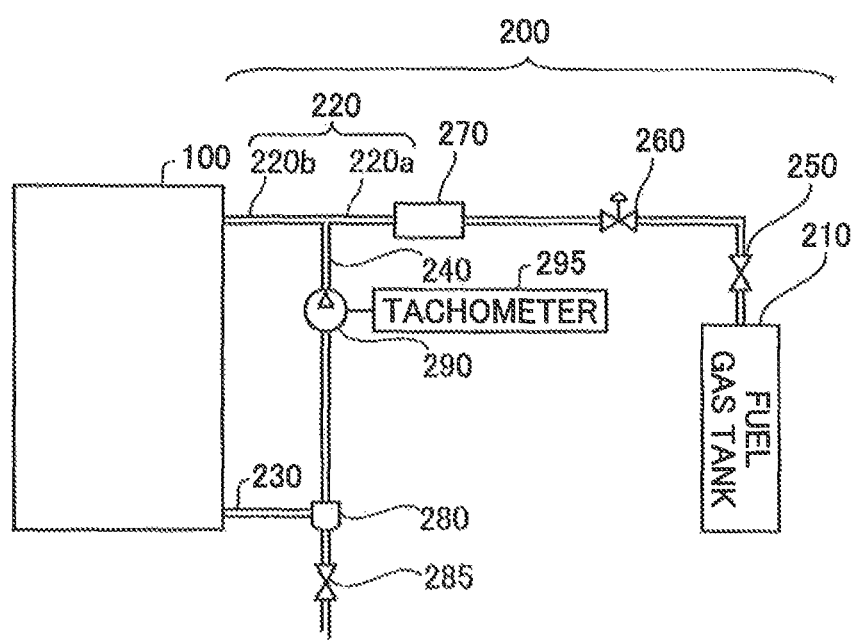
FIG. 2 is an explanatory view showing a fuel cell and a fuel gas supply/discharge system.

FIG. 2 is an explanatory view showing the fuel cell and the fuel gas supply/discharge system 200. The fuel cell system includes an oxidizing gas supply/discharge system and a cooling system in addition to the fuel gas supply/discharge system 200. However, herein described is only the fuel gas supply/discharge system 200 and description of the fuel gas supply/discharge system and the cooling system is omitted.

The fuel gas supply/discharge system 200 includes a fuel gas tank 210, a fuel gas supply flow path 220, a fuel gas discharge flow path 230, a fuel gas circulation flow path 240 (referred to also as 'circulation flow path 240'), a main stop valve 250, a regulator 260, a fuel gas injector 270 (referred to also as 'injector 270' simply), a gas-liquid separator 280, an exhaust/drain valve 285, a fuel gas circulation pump 290 (referred to also as 'circulation pump 290'), and a tachometer 295. The fuel gas tank 210 stores the fuel gas therein. In this embodiment, hydrogen gas is used as the fuel gas. The fuel gas tank 210 and the fuel cell 100 are connected to each other by the fuel gas supply flow path 220. The fuel gas supply flow path 220 includes an upstream-side fuel gas supply flow path 220a and a downstream-side fuel gas supply flow path 220b. The fuel gas supply flow path 220a is provided with the main stop valve 250, the regulator 260, and the injector 270 in this order as listed from the fuel gas tank 210 side, The main stop valve 250 serves for on/off control of supply of the fuel gas from the fuel gas tank. 210. The regulator 260 adjusts pressure of the fuel gas supplied to the fuel cell 100 to a predetermined pressure. The injector 270 injects the fuel gas to the downstream-side fuel gas supply flow path 220b intermittently at a specified first cycle. This first cycle may vary depending on the quantity of the fuel gas required in response to the power of the fuel cell 100.

The fuel gas discharge flow path 230 is used for discharging exhaust gas of the fuel gas (hereinafter, referred to also as 'fuel exhaust gas') from the fuel cell 100, The circulation flow path 240 has one end connected to the fuel gas discharge flow path 230 and the other end connected to the downstream-side fuel gas supply flow path 220b. The gas-liquid separator 280 is provided between the fuel gas discharge flew path 230 and the circulation flow path 240. The fuel exhaust gas contains unreacted hydrogen that has not undergone electrochemical reaction, hence the hydrogen being unconsumed, nitrogen that has been moved from the cathode, and water generated due to electrochemical reaction. The gas-liquid separator 280 separates water contained in the fuel exhaust gas and gases (hydrogen and nitrogen) from each other. The circulation flow path 240 is provided with the circulation pump 290. The fuel cell system recirculates fuel exhaust gas to the fuel cell 100 by using the circulation flow path 240 and the circulation pump 290 so as to reuse hydrogen contained in the fuel exhaust gas for power generation, When water has accumulated in the gas-liquid separator 280 or when impurities other than hydrogen contained in the fuel exhaust gas, such as nitrogen, have increased, the exhaust/drain valve 285 is opened, by which water and impurities are discharged. The tachometer 295 measures the rotating speed of the circulation pump 290. The rotating speed of the circulation pump 290 is controlled by the controller 110, normally, so as to be increasingly higher with increasing power of the fuel cell 100.

Figure 3:
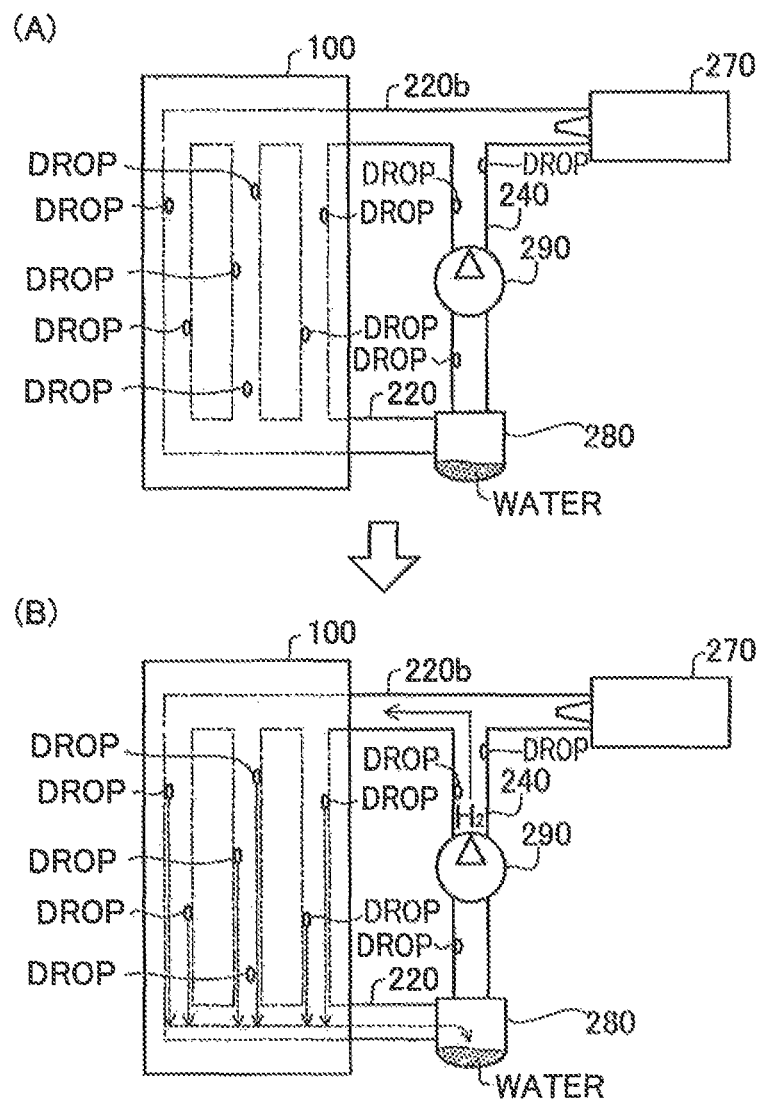
FIG. 3 is an explanatory view showing a state of the fuel gas supply/discharge system immediately before a start-up of the vehicle and a state immediately after the start-up.

FIG. 3 is an explanatory view showing a state of the fuel gas supply/discharge system 200 immediately before a start-up of the vehicle 10 and a state immediately after the start-up. FIG. 3(A) shows a state immediately before a start-up, and FIG. 3(B) shows a state immediately after a start-up. Immediately before a start-up of the vehicle 10, as shown in FIG. 3(A), water vapor contained in the fuel exhaust gas is condensed so that liquid water is residing on an anode flow path 102 in the fuel cell 100 or the circulation flow path 240. This liquid water can he discharged by letting a large quantity of gas flow into the anode flow path 102 and the circulation flow path 240. That is, as shown in FIG. 3(B), after a start-up of the vehicle 10 (after turn-on of a starter switch), the circulation pump 290 is rotated at high rotating speed so that the gas (hydrogen gas and nitrogen gas) is circulated at high speed within the anode flow path 102 and the circulation flow path 240. Liquid water residing in the anode flow path 102 and the circulation flow path 240 is blown off by the gas circulated at high speed so as to be delivered to the gas-liquid separator 280. In the gas-liquid separator 280, the liquid water is separated from the gas component (hydrogen gas and nitrogen gas) and stored in a lower part of the gas-liquid separator 280. As described. above, when liquid water has accumulated to a certain level or higher in the gas-liquid separator 280, the liquid water is discharged through the exhaust/drain valve 285. In addition, drainage from the anode flow path 102 and the circulation flow path 240 by operating the circulation pump 290 at high speed may be executed not only immediately after a start-up of the vehicle 10 but also from time to time, as required, thereafter. For example, the drainage may be executed periodically at certain time intervals. Otherwise, the drainage may be executed when a cumulative power generation amount of the fuel cell 100 has reached a certain value. Generally, when a predetermined condition for executing a process of blowing off liquid water residing on the anode flow path 102 and the circulation flow path 240 is satisfied, a process of operating the circulation pump 290 at high speed (liquid water blowoff process) is executed. The rotating speed of the circulation pump 290 in this case is a rotating speed higher than that in normal operation of the circulation pump 290 in which the blowoff of liquid water residing on the anode flow path 102 and the circulation flow path 240 is not executed.

Figure 4:
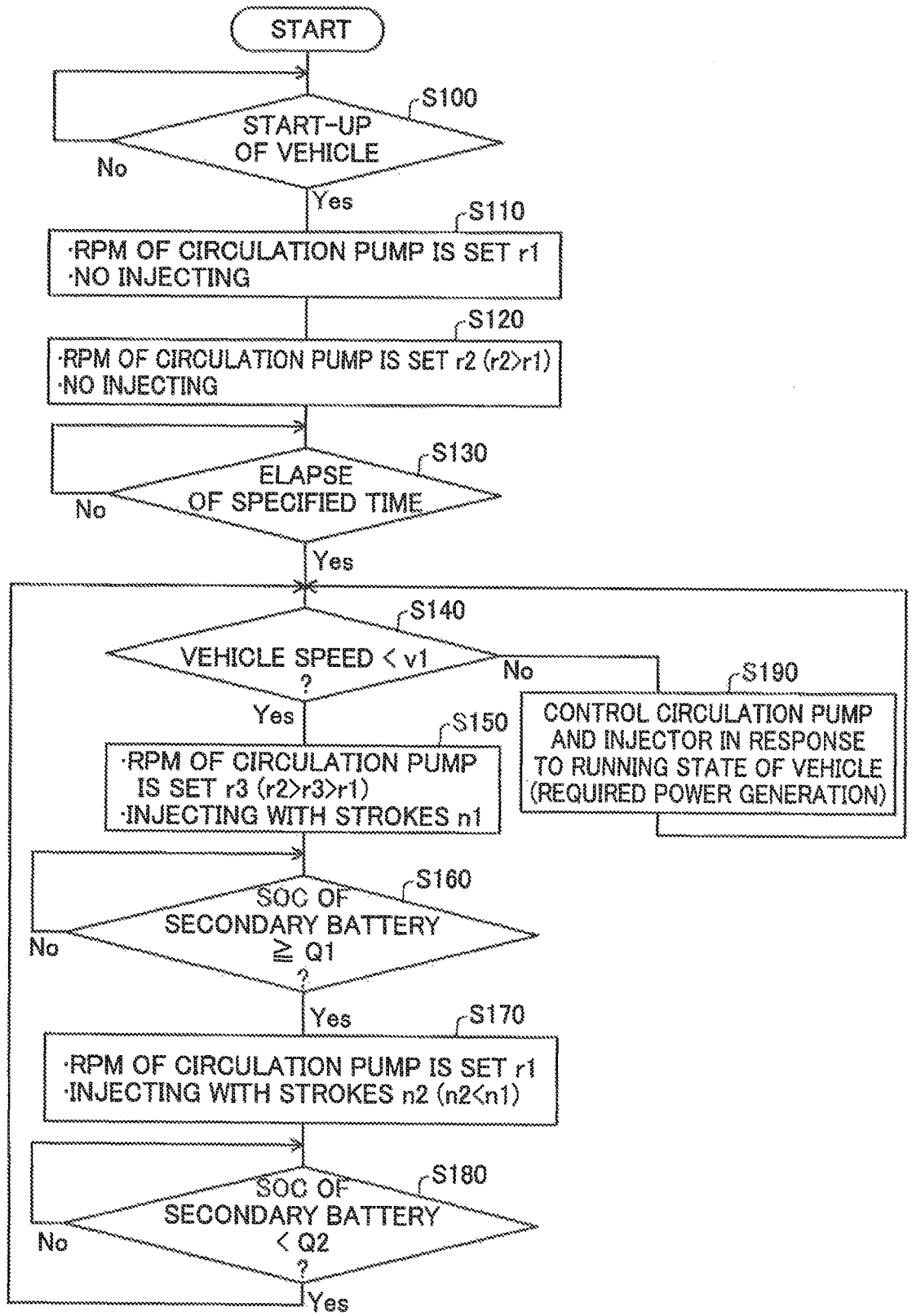
FIG. 4 is an explanatory view showing a control flowchart upon a start-up of the vehicle.

FIG. 4 is an explanatory view showing a control flowchart upon a start-up of the vehicle 10. At step S100, a standby state is maintained until the starter switch (not shown) of the vehicle 10 is pressed (No at step S100). When the starter switch is pressed, the vehicle 10 is started up (Yes at step S100). At step S110, the controller 110 sets the rotating speed of the circulation pump 290 to an RPM r1. In this step, the controller 110 does not need to make the injector 270 inject the fuel. gas. Next, at step S120, the controller 110 sets the rotating speed of the circulation pump 290 to an RPM r2 (r2>r1). This setting makes it possible to blow off water within the circulation flow path 240 and the anode flow path 102 in the fuel cell 100. As a result, when the fuel cell 100 is operated to fulfill power generation, it is possible to suppress a lowering of the cell voltage that is caused when the supply of fuel gas to an electrode (not shown) of the fuel cell 100 is impaired by water. Also, in a case where the fuel gas has not been supplied to the fuel cell 100 for a relatively long period as in the case of being immediately before a start-up of the vehicle 10, a non-uniform distribution of the fuel gas on the electrode surface results, with rich places and poor places of the fuel gas formed. When power generation is executed under this condition, there is a possibility that carbon carrying a catalyst may be oxidized (referred to as 'carbon oxidization') at poor places of the fuel gas. In this embodiment, since the rotating speed of the circulation pump 290 is, in step S120, set to the RPM r2 so as to allow a large amount of fuel gas to be circulated, a uniform distribution of the fuel gas on the electrode surface can he obtained so that carbon oxidization. during execution of the power generation can be suppressed. In addition, in the step S120, the controller 110 keeps the injector 270 from injecting the fuel gas. Since the step S120 is executed at a stop of the vehicle 10, coincidence of one timing at which the injector 270 injects the fuel gas (first timing) and another timing at which the circulation pump 290 is actuated for drainage of water (second timing) causes noise vibrations to become noticeable. Therefore, when the circulation pump 290 is actuated to execute the drainage of water, the controller 110 keeps the injector 270 from executing the injecting of the fuel gas. In addition, the controller 110, with the step S110 omitted, may execute the step S120 after a start-up of the vehicle 10, At step S130, elapse of a specified time is awaited (No at step S130). If the specified time has elapsed (Yes at step S130), the controller 110 moves to step S140, deciding whether speed of the vehicle 10 is less than a predetermined speed v1, if the speed of the vehicle 10 is not less than the predetermined speed v1 (No at step S140), then the controller 110 moves to step S190, controlling the circulation. pump 290 and the injector 270 in response to a running state (or required power generation level) of the vehicle 10. This is because, with the speed of the vehicle 10 not less than the predetermined speed v1, noise vibrations due to operations of the circulation pump 290 and the injector 270 are negligible on account of noise due to running of the vehicle or the like.

At step S140, if the speed of the vehicle 10 is less than the predetermined speed v1 (Yes at step S140), then the controller 110 sets the rotating speed of the circulation pump 290 to an RPM r3 (r2>r3>r1) at step S150 to make the injector 270 inject the fuel gas (number of injecting strokes n1) so that the fuel cell 100 executes power generation. However, because of a low speed of the vehicle 10, running of the vehicle consumes a small quantity of power, and an SOC (State Of Charge) of the secondary battery 130 charged by electric power derived from the fuel cell 100 goes on increasing. At step S160, the controller 110 waits until the SOC of the secondary battery 130 reaches Q1 or more (No at step S160). If the SOC of the secondary battery 130 has reached Q1 or more (Yes at Step S160), then the controller 110 moves to step S170. It is noted here that Q1 is, for example, an SOC level at which the secondary battery 130 is regarded as being at full charge in terms of practical use. At step S170, the controller 110 sets the rotating speed of the circulation pump 290 to the RPM r1 and sets the number of fuel-gas injecting strokes by the injector 270 to n2. In this state, the fuel cell 100 executes power generation of only the least quantity. At step S180, the controller 110 waits until the SOC of the secondary battery 130 becomes lower than Q2 (Q2<Q1), if the SOC of the secondary battery 130 has become lower than Q2 (Yes at step S180), the controller 110 moves to step S140, executing the process of step S150 or step S190 in response to the speed of the vehicle 10. In this embodiment, the number of injecting strokes by the injector 270 and the rotating speed of the circulation pump are changed over depending on whether the SOC of the secondary battery 130 is less than a predetermined value. However, this changeover may be done depending not on the SOC of the secondary battery 130 but on the power level required for the fuel cell 100.

Figure 5:
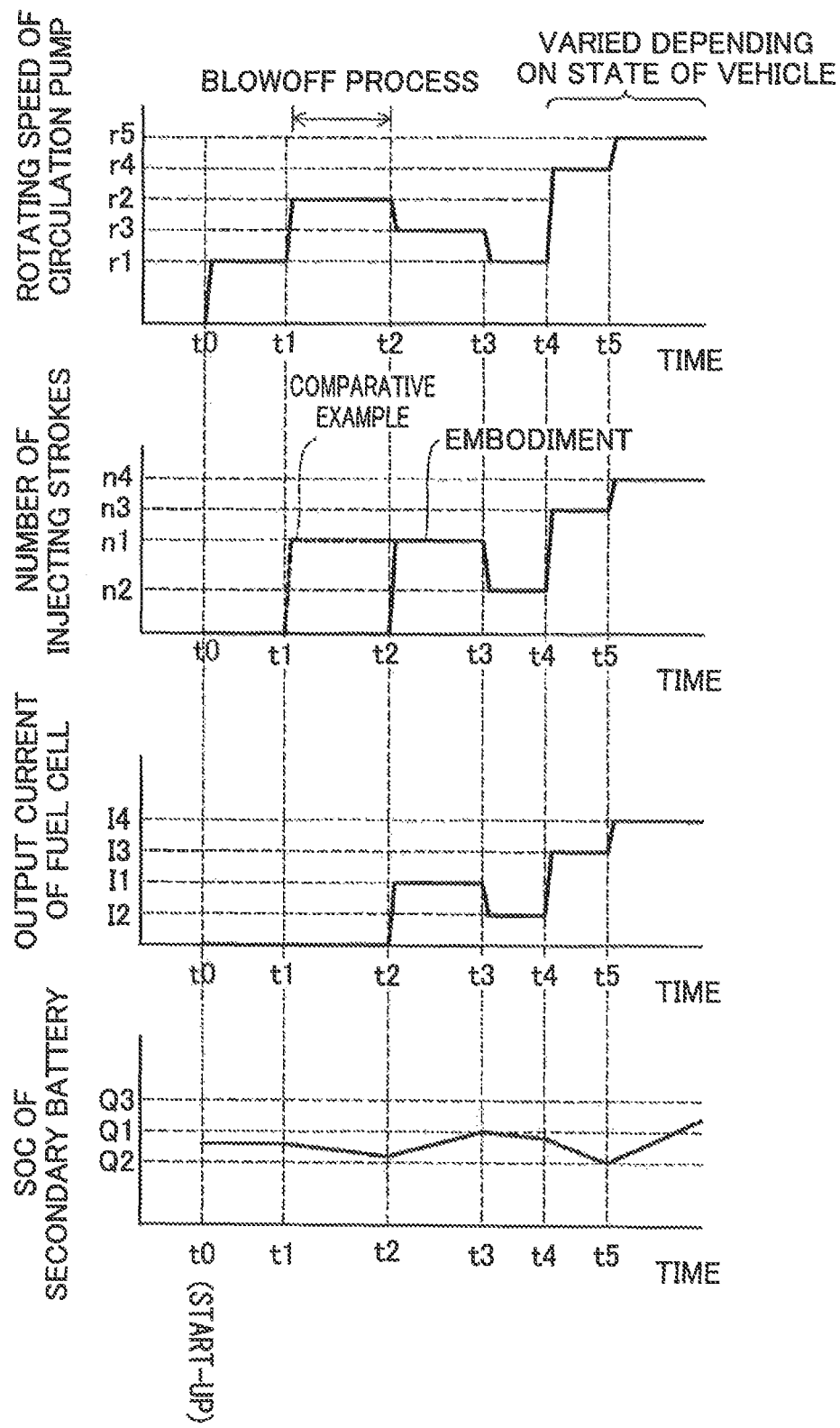
FIG. 5 is an explanatory view showing operations of a circulation pump and an injector after a start-up of the vehicle.

FIG. 5 is an explanatory view showing operations of the circulation pump 290 and the injector 270 after a start-up of the vehicle 10, When the vehicle 10 is started up at time t0 when the starter switch (not shown) is changed over to ON), the controller 110 raises the rotating speed of the circulation pump 290 to the RPM r1. Next, at time t1, the controller 110 raises the rotating speed of the circulation pump 290 to the RPM r2 so as to blow off liquid water in the anode flow path 102 and the circulation flow path 240. Also, since a large amount of gas (hydrogen gas and nitrogen gas) flows in the anode flow path 102 and the circulation flow path 240, a uniform distribution of hydrogen results, making it possible to suppress the carbon oxidization during power generation. In addition, electric power for driving the circulation pump 290 may be supplied from not only the fuel cell 100 but also the secondary battery 130. In this case, the injector 270 is not driven so that fuel gas (hydrogen gas) is not supplied to the fuel gas supply flow path 220b. Although the controller 110 sets the rotating speed of the circulation pump 290 to the RPM r1 for time t0 to t1, this process may be omitted. That is the controller 110 may set the rotating speed of the circulation pump 290 to the RPM r2 when the starter switch is changed over to ON.

At time t2, the controller 110 sets the rotating speed of the circulation pump 290 to the RPM r3 (r2>r3>r1) so as to make the injector 270 inject fuel gas (n1 strokes/hour). By this operation, the fuel cell 100 starts power generation. Part of electric power generated in this case is used for electricity accumulation (charging) of the secondary battery 130 so that the SOC of the secondary battery 130 goes on increasing.

At time t3, at which the SOC of the secondary battery 130 reaches the predetermined value Q1, the quantity of electric power to be generated by the fuel cell 100 becomes smaller and therefore the number of fuel-gas injecting strokes by the injector 270 is set to the injecting strokes n2 to lower the power generation level. As a result, the SOC of the secondary battery 130 goes on decreasing.

Thereafter, when a current request (power request) for the fuel cell 100 is increased to current 13, 14 due to a start-up of an air conditioner (not shown) or the like or a running of the vehicle 10, the number of injecting strokes of the injector 270 is increased to numbers of injecting strokes n3, n4 in response to an increase in the power request for the fuel cell 100 and the rotating speed of the circulation pump 290 is increased to the RPM r4, r5. In addition, the numbers of injecting strokes n3, n4 may be greater than the number of injecting strokes n1, and the RPMs r4, r5 may be greater than the RPM r2, Preferably, a fuel-gas injecting quantity per stroke is set to a preset constant value. It should be noted that 'number of injector injecting strokes' shown in FIG. 5 refers to the number of fuel-gas injecting strokes, and actually the fuel gas is injected at intermittent timing of n strokes per minute.

A comparison is made between a comparative example and this embodiment. In the comparative example, as a start-up process is executed, the fuel gas is injected from the injector 270. As a result, during a period from time t1 to t2, a first timing at which the fuel gas is injected from the injector 270 and a second timing at which liquid water residing on the circulation flow path 240 is blown off coincide with each other. In this case, the term 'timing' refers not to, for example, a short moment of injection but to an entire period during which the injection is executed intermittently. That is, during the period from time t1 to t2, the process of injecting the fuel gas from the injector 270 is executed and moreover the process of blowing off the liquid water residing on the circulation flow path 240 is also executed. As a result, pressure pulsations and operating noise of the circulation pump 290 resonate to generate noise vibrations. These noise vibrations may be noticeable particularly immediately after a start-up of the vehicle 10, at which no noise vibrations due to running are generated.

In contrast, in this embodiment, the rotating speed of the circulation pump 290 is raised to the RPM r2, which is preset for blowoff of the liquid water, without injecting the fuel gas from the injector 270. Thereafter, the rotating speed of the circulation pump 290 is lowered to the RPM r3, which is lower than the RPM r2, while the fuel gas is injected from the injector 270. As a result, the first timing at which the fuel gas is injected from the injector 270 and the second timing at which the liquid water residing on the circulation flow path 240 do not coincide with each other, so that generation of noise vibrations due to resonance between the pressure pulsations and the operating noise of the circulation pump 90 can be suppressed. In addition, it is possible for the circulation pump 290 to drain the liquid water to some extent even with the RPM r3 (r3<r2).

As described above, according to this embodiment, when the first timing at which the fuel gas is injected by the injector 270 and the second timing at which the rotating speed of the circulation pump 290 is set to the RPM r2 to discharge the residing liquid water coincide with each other, the controller 110 performs either: (i) the first process of operating the circulation pump 290 at the preset RPM r2 without executing the process of injecting the fuel gas by the injector; or (ii) the second process of injecting the fuel gas by the injector 270 and moreover operating the circulation pump 290 at the RPM r3, which is lower than the preset RPM r2. Thus, generation of noise vibrations due to resonance between the pressure pulsations and the operating noise of the circulation pump 290 can be suppressed.

Figure 6:
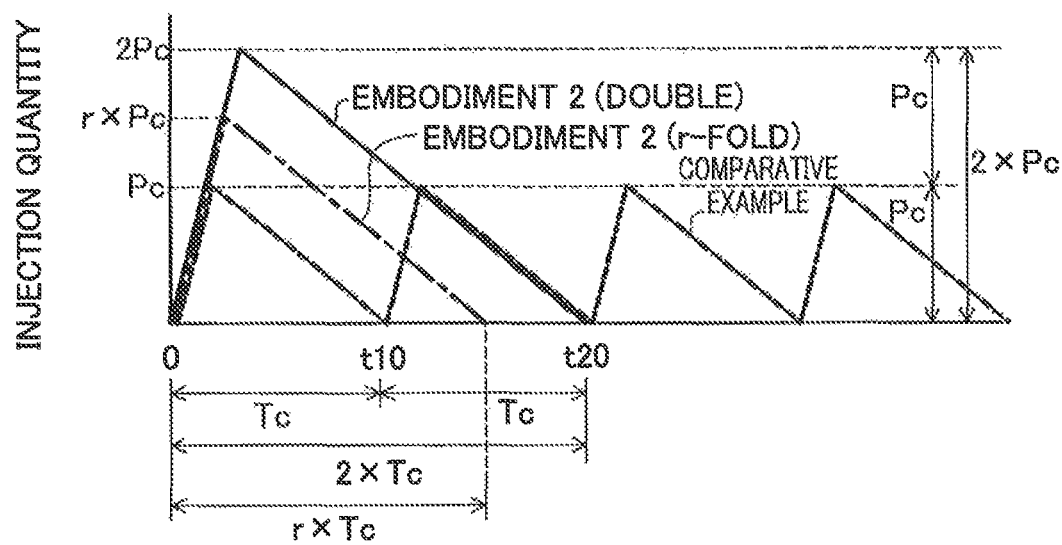
FIG. 6 is an explanatory view showing a second embodiment.

FIG. 6 is an explanatory view of a second embodiment. The second embodiment is carried out during a period from time t3 to t4 in FIG. 5. It is assumed that during this period, for example, the first process and the second process are not being performed, the vehicle 10 is at a stop, and a required power for the fuel cell 100 is small. In this case, with the fuel-gas injecting frequency set to 2 strokes per minute, there is a possibility that noise vibrations due to the injecting of the fuel gas may give passengers uneasy or uncomfortable feelings. Therefore, in this case, the injection quantity per stroke Pc is set to an r-fold one (where r is a real number of 1 or more), the injection cycle Tc is set to an r-fold one, and the fuel-gas injecting frequency is decreased to n5 strokes per minute (n5=n3/r). That is, the injection cycle Tc is lengthened. By doing so, the generation frequency of noise vibrations is lowered, so that the possibility of giving uneasy or uncomfortable feelings to passengers can be reduced, In addition, since the fuel-gas injection quantity per stroke Pc is multiplied r-fold and the injection cycle Tc is multiplied r-fold, the total fuel-gas injection quantity is unchanged. In addition, FIG. 6 shows examples resulting when the injection quantity per stroke Pc is doubled and multiplied r-fold as an example. When the fuel-gas injection quantity per stroke Pc is doubled, the controller 110 sets the injection cycle Tc of the injector 270 to a double, i.e., 2×Tc.

Preferably, the process of multiplying the injection cycle Tc of the injector 270 r-fold is executed in the case where the first. process and the second process are not being performed, the vehicle is at a stop and the power of the fuel cell 100 is equal to or lower than a predetermined power value. However, even in a case where the vehicle is not at a stop, the above-described process may also be executed. when the power of the fuel cell 100 is equal to or lower than a predetermined power value, Besides, it is also possible not to execute the process of multiplying the injection cycle Tc of the injector 270 r-fold (where r is a real number of 1 or more).

Hereinabove, although embodiments of the present invention have been described based on some working examples, the above-described embodiments of the invention should be construed as being intended to give an easier understanding of the invention only and not to limit the invention in any sense. The invention may be changed and modified without departing from the gist of the invention or from the scope of the appended claims and equivalents to such changes and modifications are included in the invention, of course.

Modification 1

In the foregoing embodiments, in a case where a predetermined condition for executing the process of blowing off liquid water residing on the circulation flow path 240 is satisfied, the liquid water blowoff process (first process) in which the circulation pump 290 is operated at the RPM r1, which is lower than an RPM r0 preset for blowoff of the liquid water, to inject the fuel gas by the injector 270 is executed (during the period from time t1 to t2 in FIG. 5). Instead of this, it is also allowable that the liquid water blowoff process as described above is executed only when the vehicle 10 is at a stop or when running speed of the vehicle 10 is equal to or lower than a predetermined low-speed threshold, and that the circulation pump 290 is operated at the high RPM r0, which is preset for blowoff of the liquid water when the vehicle is running at a speed higher than the low-speed threshold. By doing so, noise vibrations can be suppressed so as to prevent excessive noise vibrations from being given to the passengers, and moreover the liquid water residing on the circulation flow path 240 can be blown off enough. In addition, the 'low-speed threshold' is empirically set to such a small speed that uneasy or uncomfortable feelings are not given to passengers by noise vibrations which are due to operation of the circulation pump 290 at the high RPM r0 or injection of the fuel gas from the injector 270 under the condition of sufficiently increased noise derived from the running. For example, the low-speed threshold can be set within a speed range of 0 km to 20 km per hour and, preferably, net to within a speed range of 0 km to 10 km per hour.

Modification 2

The process of multiplying the injection cycle r-fold to obtain an r-fold injection quantity per stroke as described above is, preferably, executed only when the running speed of the vehicle is equal to or lower than the predetermined low-speed threshold. By doing so, noise vibrations can be suppressed so as to prevent excessive noise vibrations from being given to the passengers, and moreover the liquid water residing on the anode flow path 102 and the circulation flow path 240 can be blown off enough.

What is claimed is:

1. A fuel cell system comprising:
    a fuel cell;
    a fuel gas supply flow path configured to supply a fuel gas to the fuel cell;
    an injector configured to intermittently inject the fuel gas to the fuel gas supply flow path;
    a fuel gas discharge flow path configured to discharge a fuel exhaust gas from the fuel cell;
    a circulation flow path connecting the fuel gas supply flow path and the fuel gas discharge flow path to each other;
    a circulation pump provided on the circulation flow path and configured to supply the fuel exhaust gas to the fuel gas supply flow path; and
    a controller configured to control a rotating speed of the circulation pump to a preset RPM (Revolutions Per Minute) to discharge water residing on the circulation flow path, wherein
    when a first timing at which the fuel gas is injected to the fuel gas supply flow path by the injector and a second timing at which the water residing on the circulation flow path is discharged by controlling the rotating speed of the circulation pump coincide with each other, the controller performs either:
        (i) a first process of operating the circulation pump at the preset RPM without injecting the fuel gas to the fuel gas supply flow path by the injector; or
        (ii) a second process of injecting the fuel gas to the fuel gas supply flow path by the injector and operating the circulation pump at an RPM lower than the preset RPM.

2. The fuel cell system in accordance with claim 1, wherein
    when the first process and the second process are not being performed, and power of the fuel cell is equal to or lower than a predetermined power value, the controller performs a third process of increasing a fuel-gas injection quantity per stroke from the injector in comparison to that of the case where the power of the fuel cell is greater than the predetermined power value, and intermittently injecting the fuel gas at a injection cycle longer than an injection cycle preset for injection of the fuel gas.

3. The fuel cell system in accordance with claim 2, wherein
    in the third process, the controller multiplies the injection quantity per stroke r-fold and multiplies the injection cycle r-fold (where r is a real number of 1 or more).

4. A fuel cell-mounted vehicle comprising:
    a vehicle; and
    a fuel cell system comprising a fuel cell; a fuel gas supply flow path configured to supply a fuel gas to the fuel cell; an injector configured to intermittently inject the fuel gas to the fuel gas supply flow path; a fuel gas discharge flow path configured to discharge a fuel exhaust gas from the fuel cell; a circulation flow path connecting the fuel gas supply flow path and the fuel gas discharge flow path to each other; a circulation pump provided on the circulation flow path and configured to supply the fuel exhaust gas to the fuel gas supply flow path; and a controller configured to control a rotating speed of the circulation pump to a preset RPM (Revolutions Per Minute) to discharge water residing on the circulation flow path,
    when a first timing at which the fuel gas is injected to the fuel gas supply flow path by the injector and a second timing at which the water residing on the circulation flow path is discharged by controlling the rotating speed of the circulation pump coincide with each other, the controller performs either:

(a) executes either the first process or the second process if a running speed of the vehicle is equal to or lower than a predetermined low-speed threshold; and
(b) operates the circulation pump at an RPM preset for blowoff of the liquid water if the running speed of the vehicle is higher than the low-speed threshold.

5. The fuel cell-mounted vehicle in accordance with claim 4, wherein
when the first process and the second process are not being performed, and power of the fuel cell is equal to or lower than a predetermined power value, the controller performs a third process of increasing a fuel-gas injection quantity per stroke from the injector in comparison to that of the case where the power of the fuel cell is greater than the predetermined power value, and intermittently injecting the fuel gas at a injection cycle longer than an injection cycle preset for injection of the fuel gas.

6. The fuel cell-mounted vehicle in accordance with claim 5, wherein
in the third process, the controller multiplies the injection quantity per stroke r-fold and multiplies the injection cycle r-fold (where r is a real number of 1 or more).

7. A method of controlling a fuel system, wherein the fuel system comprising an injector configured to intermittently inject a fuel gas to a fuel gas supply flow path supplying the fuel gas to a fuel cell, and a circulation pump provided on a circulation flow path connecting the fuel gas supply flow path and a fuel gas discharge flow path discharging a fuel exhaust gas from the fuel cell and configured to supply the fuel exhaust gas to the fuel gas supply flow path, comprising:
when a first timing at which the fuel gas is injected to the fuel gas supply flow path by the injector and a second timing at which the water residing on the circulation flow path is discharged by controlling the rotating speed of the circulation pump coincide with each other, performing either
(i) a first process of operating the circulation pump at the preset RPM without injecting the fuel gas to the fuel gas supply flow path by the injector; or
(ii) a second process of injecting the fuel gas to the fuel gas supply flow path by the injector and operating the circulation pump at an RPM lower than the preset RPM.

* * * * *